June 26, 1962  B. WALKER  3,041,086

CABLE CONNECTED AUXILIARY VEHICLE SUSPENSION

Original Filed May 11, 1954

INVENTOR.
Brooks Walker

United States Patent Office 3,041,086
Patented June 26, 1962

3,041,086
CABLE CONNECTED AUXILIARY VEHICLE SUSPENSION
Brooks Walker, 15 Montgomery St., San Francisco, Calif.
Original application May 11, 1954, Ser. No. 429,019, now Patent No. 2,872,209, dated Feb. 3, 1959. Divided and this application Mar. 13, 1958, Ser. No. 721,317
16 Claims. (Cl. 280—124)

This invention is a division of my application, Serial No. 429,019, filed May 11, 1954, for Cable Connected Auxiliary Vehicle Suspension, now Patent No. 2,872,209, issued February 3, 1959.

This invention pertains to improvements in vehicle suspension systems, particularly pertaining to means of varying the rate or degree of suspension support at given axle-to-frame clearance.

One object is to provide a vehicle suspension with variable length shackles connecting the suspension to the suspension springs or auxiliary suspension springs or yieldable means.

Another object is to provide a single leaf spring across the rear of the vehicle with variable length shackles to the axle to provide variable support by power change means.

Another object is to have a single power source operate the variable supports at each rear wheel and provide sway stabilizing at the same time.

Another object is to provide arms pivoted to the spring chassis yieldably urged to supporting position and variable length shackles to provide variable support.

Another object is to provide shock absorbers associated with the primary support and with the supplementary support so that the shock absorber resistance is increased as more action is applied through the auxiliary support than when the support from the auxiliary support is reduced substantially.

Other objects of the invention will be more particularly pointed out in the accompanying specifications and claims.

I have illustrated my invention by way of example in the accompanying drawings, in which.

In all figures like numerals of reference refer to corresponding parts.

Figure 1:
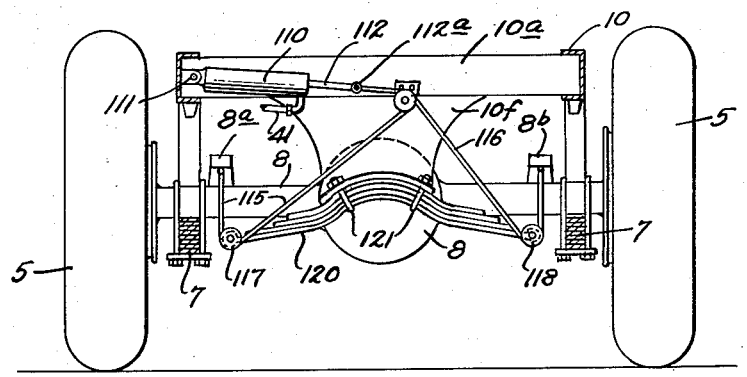
FIG. 1 shows one form of the invention in rear elevation with part of the vehicle cut away.

In FIG. 1 I have shown a rear elevation looking forward from just back of the rear axle, in which the vehicle frame 10 is supported by leaf springs 7 in the conventional manner, and axle 8 has extensions 8a and 8b which carry the ends of cables 115 and 116, respectively. These cables 115 and 116 pass over pulleys 117 and 118 which are attached to the opposite ends of leaf spring 20. Leaf spring 120 is secured at its center by two U-bolts 121 which secure the spring to extension 10f which may be, in turn, secured to cross member 10a. Hydraulic cylinder 110 is pivotally attached to the vehicle frame 10 by bolt 111 and has piston rod 112. The outer end of the piston rod 112 is secured to cables 115 and 116 at adapter 112a. By this construction it can be seen that when the pressure in line 41 going to the piston rod end of cylinder 110 is released, piston rod 112 will be extended by the action of the axle 8 in being moved up going over bumps, and cables 116 and 115 will be slack so that overload spring 120 will be inoperative during most of the normal action of axle 8. As it is desired to have overload spring 120 carry more and more load, pressure is fed to cylinder 110 through line 41 from a manually operated pump, a power steering pump, or other source of pressure as described in my previously identified application. Even an air line in a gas station could be used as a source of pressure. Cables 115 and 116 will be tightened so as to put more and more load on the ends of spring 120 where pulleys 117 and 118 are attached. Practically no unsprung weight is added to the vehicle axle or wheel supporting structure by this construction when the overload is inactive and a considerable degree of overload variation is available through the positioning of piston rod 112.

Figure 2:
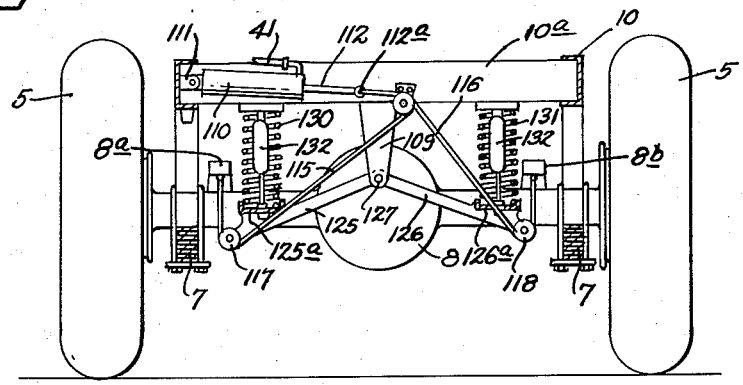
FIG. 2 shows another form of the invention in a similar view.

In FIG. 2 I have shown an alternate construction which is somewhat similar in operation to that shown in FIG. 1 as the views in each case are taken similarly with respect to the vehicle. In the case illustrated in FIG. 2, however, frame extension 109 extends from cross member 10a to down near the differential housing of axle 8 where it supports a pivot 127. Bearinged to this pivot are two connecting arms 125 and 126 somewhat similar in operation to the lower link of a conventional knee-action front suspension. Pulleys 117 and 118 are attached respectively to the ends of links or arms 125 and 126. Saddles 125a and 126a receive the lower end of compression auxiliary springs 130 and 131 at each side of the vehicle. A suitable saddle at the top end of the springs 130 and 131 may be carried by the cross member 10a. Where it is desired to have additional shock absorber resistance in connection with the additional spring support of the overloads, telescoping-type shock absorbers 132 may be nested within the springs in a manner similar to that used in connection with front knee-action suspension. Cables 115 and 116 are operated by cylinder 110 in a manner similar to that described in FIG. 1.

Figure 3:
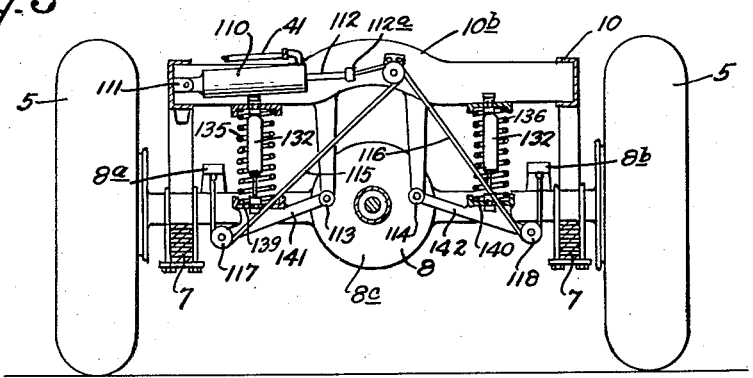
FIG. 3 shows another form of the invention in a similar view.

In FIG. 3 I have shown a different construction and the view is taken looking at the rear axle from the forward end of the car. The overload springs 135 and 136 are carried on cross member 10b which is located ahead of the rear axle and has a hump to clear the differential housing extension for the pinion housing 8c. The links 141 and 142 which support the lower end of springs 135 and 136 and saddles 139 and 140 and the ends of shock absorbers 132 are shorter than in FIG. 2 because they are pivoted at their lower ends at 113 and 114 at points further from the center of the vehicle than pivot 127 was in FIG. 2. Extensions 8a and 8b support the ends of cables 115 and 116 which operate in a manner similar to that described in connection with FIGS. 1 and 2. The operation of this type of overload which operates in front of the rear axle is by relaxing the pressure in line 41 which allows piston rod 112 to be extended by the action of the axle 8, so that the cables 115 and 116 are slack and overload springs 135 and 136 are substantially inactive. As more overload spring action is desired, pressure is put into line 41 which retracts piston rod 112, tightens cables 115 and 116, and makes the overload springs 135 and 136 effective to varying degrees up to the maximum when piston rod 112 is fully retracted.

The arms 125 and 126 in FIG. 2 and the arms 141 and 142 cooperate with the other elements to provide a load transmitting mechanism; similarly the leaf springs 7 also function as a side thrust carrying mechanism; the cables 115 and 116 comprise, with the pulleys 117 and 118 and their end connections, variable length shackles connected to fixed points on the auxiliary resilient support means, which comprise springs 120 in FIG. 1, springs 130 and 131 and arms 125 and 126 in FIG. 2, and springs 135 and 136 and arms 141 and 142 in FIG. 3.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. A vehicle having a body, supporting rear wheels, a mechanism on which said wheels rotate, yieldable means supporting a portion of said body on said wheels, transversely disposed auxiliary yieldable support means supporting the same portion of said body on said wheels, shackle means connecting said auxiliary yieldable support means to said mechanism and connected to fixed points on said auxiliary yieldable support means, said shackle means being a flexible member extending over pulley means which varies the effective length thereof, and power means for varying the effective length of said shackle means.

2. A vehicle having a body, supporting rear wheels, a mechanism on which said wheels rotate, yieldable means supporting a portion of said body on said wheels, auxiliary yieldable support means supporting the same portion of said body on said wheels, a shackle formed of flexible cable connected to a fixed point on said auxiliary yieldable support means and connecting said auxiliary yieldable support means to said mechanism, said shackle being of variable effective length, and power means for varying the effective length of said shackle.

3. A vehicle having a body, supporting rear wheels, a mechanism on which said wheels rotate, yieldable means supporting a portion of said body on said wheels, auxiliary yieldable support means between said mechanism and said body, a shackle formed of flexible cable, connected to a fixed point on said auxiliary means and connecting said auxiliary means to said mechanism, said shackle being of variable effective length, and power means for varying the effective length of said shackle, said power means including a hydraulic cylinder and a piston rod connected to said flexible cable.

4. A vehicle having a body, supporting rear wheels, a mechanism on which said wheels rotate, yieldable means supporting a portion of said body on said wheels, auxiliary yieldable support means between said mechanism and said body including a single transverse spring, a lengthwise extensible shackle connected to a fixed point at each end of said spring and connecting said spring to said mechanism, said shackles each being of variable effective length embodying a flexible member and extending over pulley means, and power means for varying the effective length of said shackle.

5. A vehicle having a body, rear wheels, primary suspension means, mechanism on which said wheels rotate, auxiliary resilient suspension means, a pulley connected to said auxiliary means at a fixed point at each side of said vehicle, said pulleys being urged downward by said auxiliary resilient means relative to said vehicle, a cable passing under each said pulley and connected to said mechanism on each side of said vehicle, and means for tightening said cable to increase the support of said body by said auxiliary resilient means at a set body-to-mechanism space interval.

6. A vehicle having a body, rear wheels, primary suspension means, mechanism on which said wheels rotate, auxiliary resilient suspension means, a pulley connected to said auxiliary means at a fixed point at each side of said vehicle, said pulley being urged downward by said auxiliary resilient means relative to said vehicle, a cable passing under each said pulley and connected to said mechanism on each side of said vehicle, and means for tightening said cable to increase the support of said body by said auxiliary resilient means at a set body-to-mechanism space interval, said means for tightening said cable including a fluid actuated cylinder.

7. In a motor vehicle, the combination of a vehicle frame; a pair of rear wheels with supporting structure therefor, a pair of main resilient means, one between each said rear wheel and said frame; auxiliary resilient means supported by said frame; connectors each operatively secured at one end to the supporting structure for one rear wheel; and hydraulic control means, said connectors being operatively connected at their other ends to said hydraulic control means and in between ends to a fixed point on said auxiliary resilient means, said hydraulic control means functioning for tightening and loosening said connectors for changing the effectiveness of said auxiliary resilient means, said connectors including variable length shackles transmitting vertical supporting force from said fixed point on said auxiliary resilient means to said frame.

8. A vehicle having a sprung portion, rear wheels, supporting structure for said rear wheels, mechanism connecting said structure to said sprung portion, a single resilient means for supporting a portion of said sprung portion on said supporting structure for said rear wheels through a variable load carrying device, said device including a variable length shackle embodying a flexible member extending over pulley means connected to a fixed point on said resilient means, and power operated means for changing the effective length of said shackles.

9. In combination, a motor vehicle, a vehicle body, a pair of rear wheels, supporting structure for said rear wheels, resilient means between said wheels and said body, said resilient means normally supporting one end of said body, auxiliary resilient means attached to said supporting structure by flexible means, and means controllable from the vehicle interior for tightening or loosening said flexible means to render said auxiliary resilient means more or less effective, said auxiliary resilient means including a transverse leaf spring with pulleys at its ends, said flexible means including cables passing over said pulleys and forming a variable length linkage between fixed points on the ends of said transverse spring and the structure on which said rear wheels are mounted.

10. A vehicle having a sprung portion, rear wheels, supporting structure for said rear wheels, mechanism connecting said structure to said sprung portion, resilient means for supporting a portion of said sprung portion on said supporting structure for said rear wheels through a variable load carrying device, said device including a variable length shackle embodying a flexible member extending over pulley means connected to a fixed point on said resilient means, and power operated means for varying the effective length of said shackle, said variable load carrying device including a single spring having ends acting independently near each rear wheel supporting structure.

11. In a motor vehicle suspension system, a body frame, a wheel-supporting structure, spring means connected to and extending between said frame and said structure for resiliently supporting the frame on the structure, auxiliary means for supporting a portion of the weight of said frame, said auxiliary means comprising a leaf spring secured intermediate its ends to said body frame and extending transversely of said vehicle, and extensible shackle means connected to said frame and said supporting means and engaged with the ends of said leaf spring so that said ends are movable relative to said wheel supporting structure upon the extension and retraction of said shackle means for transferring load from said frame to said leaf spring in amounts dependent on the positions of the ends thereof.

12. In a motor vehicle suspension system, a body frame, a wheel-supporting structure, spring means connected to and extending between said frame and said structure for resiliently supporting the frame on the structure, auxiliary means for supporting a portion of the weight of said frame, said auxiliary means comprising a leaf spring secured intermediate its ends to said body frame and extending transversely of said vehicle, extensible shackle means connected to said frame and said supporting means and engaged with the ends of said leaf spring so that said ends are movable relative to said wheel supporting structure upon the extension and retraction of said shackle means for transferring load from said frame to said leaf spring in amounts dependent on the positions of the ends thereof, and power means on said frame connected to said shackle means for positioning said shackle means relative to said leaf spring.

13. A vehicle having a body, rear wheels for supporting said body, a housing supported between said rear wheels, yieldable means supporting a portion of said body on said housing, auxiliary yieldable support means supporting the same portion of said body on said housing, and variable length shackle means embodying a flexible member extending over pulley means having one end supported on said body the other end being connected to said auxiliary means, said shackle means being of such construction that shortening its length at a given housing to body clearance provides increased support by said auxiliary yieldable support means.

14. A vehicle having a body, rear wheels for supporting said body, a housing supported between said rear wheels, yieldable means supporting a portion of said body on said housing, auxiliary yieldable support means supporting the same portion of said body on said housing, variable length shackle means embodying a flexible member extending over pulley means having one end supported on said body, the other end being connected to said auxiliary means, and power means on said body for changing the effective length of said shackle means.

15. A vehicle having a body, rear wheels for supporting said body, a housing supported between said rear wheels, yieldable means supporting a portion of said body on said housing, auxiliary yieldable support means supporting the same portion of said body on said housing, and variable length shackle means embodying a flexible member extending over pulley means having one end supported on said body, the other end being connected to said auxiliary means, said shackle means changing in length from that set at a given housing to body clearance which varies inversely with a change in distance between said housing and body clearance.

16. A vehicle having a body, rear wheels for supporting said body, a housing supported between said rear wheels, yieldable means supporting a portion of said body on said housing, auxiliary yieldable support means supporting the same portion of said body on said housing, and variable length shackle means embodying a flexible member extending over pulley means having one end supported on said body, the other end being connected to said auxiliary means, said shackle means varying in length during a change in the amount of support supplied by the auxiliary spring at a given housing to body clearance.

References Cited in the file of this patent
UNITED STATES PATENTS

| | | |
|---|---|---|
| 1,377,913 | Neff | May 10, 1921 |
| 1,429,411 | Davidson | Sept. 19, 1922 |
| 1,602,337 | Chandler | Oct. 5, 1926 |
| 2,304,780 | Fries | Dec. 15, 1942 |
| 2,705,139 | Nallinger | Mar. 29, 1955 |